J. DRUMMOND & C. & F. SPUHEL.
PNEUMATIC TIRE.
APPLICATION FILED NOV. 10, 1916.
1,233,853. Patented July 17, 1917.
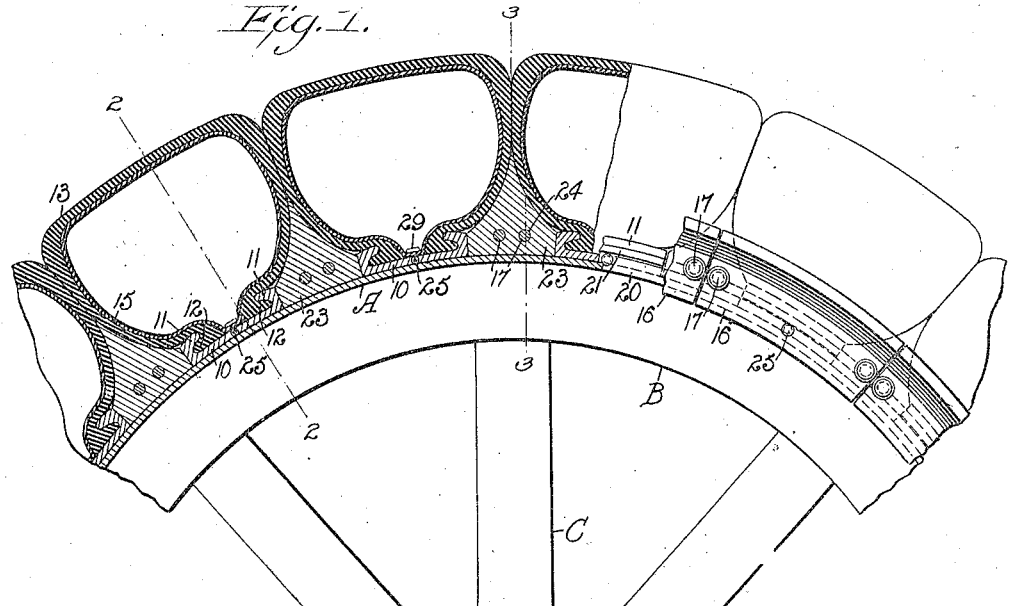
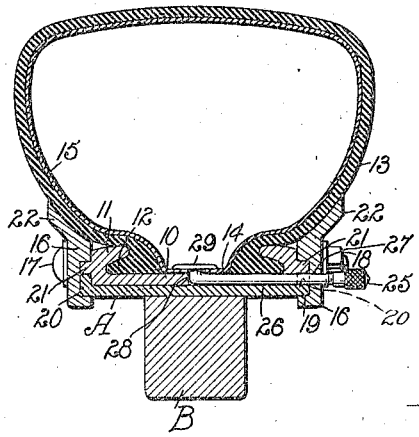
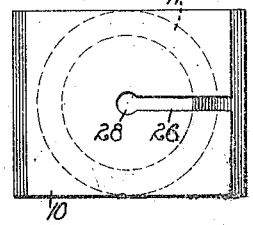
WITNESSES
INVENTORS
James Drummond
Carl Spuhel
Fritz Spuhel
BY
ATTORNEYS

UNITED STATES PATENT OFFICE.

JAMES DRUMMOND, CARL SPUHEL, AND FRITZ SPUHEL, OF KANSAS CITY, MISSOURI.

PNEUMATIC TIRE.

1,233,853.     Specification of Letters Patent.     Patented July 17, 1917.

Application filed November 10, 1916. Serial No. 130,554.

*To all whom it may concern:*

Be it known that we, JAMES DRUMMOND, CARL SPUHEL, and FRITZ SPUHEL, citizens of the United States, and residents of Kansas City, in the county of Jackson and State of Missouri, have invented a new and Improved Pneumatic Tire, of which the following is a full, clear, and exact description.

Our invention relates to a tire made up of an annular series of cells whereby the puncturing of an individual cell will not affect the remaining cells.

Objects of the invention are to provide a tire of the indicated type in which the separate cells will be formed of pneumatic sections complete and independent as to their shoes or casings and the securing means for the sections; and to provide for attaching or detaching any particular cell or cells without affecting the adjacent cells.

Further objects of the invention are to provide securing means for the individual sections of a strong and simple form, and of a character to promote facility in attaching or detaching a cell or cells.

The invention will be particularly explained in the specific description following.

Reference is to be had to the accompanying drawings forming a part of this specification in which similar reference characters indicate corresponding parts in all the views.

Figure 1 is a partly sectional side elevation of a portion of a wheel equipped with our improved tire;

Fig. 2 is a cross section on the line 2—2, Fig. 1;

Fig. 3 is a cross section on the line 3—3, Fig. 1;

Fig. 4 is an inverted plan view of one of the clencher seats;

Fig. 5 is a view similar to Fig. 3, and showing additional supporting means on the felly beneath the channeled rim.

In the illustration, the letter A represents a channeled rim applied to the felly B of the wheel C.

In carrying out our invention we provide individual seats 10 which are generally rectangular, formed with clencher elements 11 rigid therewith and extending continuously in approximately round form, or at all events, having a form to present clencher members at both sides and at the front and back of the element 10. Each seat 10 with its clencher element 11 receives a separate bulb-like pneumatic tire section or air reservoir. Each separate reservoir section includes a shoe or casing 13 which advantageously is generally of bulbous form being continuous at the top and sides and having at the under side an annular clencher rib or bead 12 receivable within the clencher element 11. The casing has a central opening at the inner side for the passage of the air valve hereinafter described. Within the casing 13 is an inner resilient sack 15 depressed at the center at the inner side as at 14 to conform to the formation of the casing 13 at the opening therein. The several sacks 15 of the air reservoirs collectively constitute the equivalent of an inner tube in a pneumatic tire. In order that the separate air reservoirs comprising the casing 13 and sacks 15 with their separate clencher seats 10, may be independently attachable and detachable, we provide at each side an annular series of sector-shaped clamp sections 16. The respective clamps at the opposite sides are secured by transverse bolts 17 having nuts 18, the bolts being provided in pairs between adjacent seats 10. The clamp sections 16 at the inner side are formed with curved grooves or recesses 19 which receive the radial ribs 20 on the wheel rim A and receive also, lateral ribs 21 formed on the sides of the clencher seats 10. It will thus be seen that the clamps 16 and their bolts 17 interengage both the rim A and the clencher seats 10, thereby positively preventing displacement of the said seats but permitting the ready detachment of any particular seat with its supported and clenched air reservoir section. The clamps 16 are formed with flaring flanges 22 that extend a short distance along the opposite sides of the shoes 13.

It will be observed that the air reservoirs are contracted toward the inner side and the clencher seats 10 are accordingly of less diameter than the outer portions of the reservoirs. Therefore the adjacent seats 10 are spaced annularly on the rim A and the spaces taper radially outward to conform to the formation of the casings 13. In the spaces between the seats and reservoirs filler blocks 23 are interposed, the adjacent faces of said blocks at the bases thereof and the seats 10 being approximately radial. Outward from the seats 10 the blocks 23 taper on curved lines to snugly fill the spaces between the reservoir sections. Thus, the reservoirs are firmly seated and clenched at the inner sides on the seats 10. At the front and back each reservoir is braced by the blocks 23 while radially outward from the tapered ends of said blocks, the shoes of each reservoir are in firm contact to give mutual support to one another. The bolts 17, it will be observed, pass through the blocks 23, the latter having transverse holes 24 for the purpose.

In order that the tire valves for the respective pneumatic tire sections may be removable with the tire or tire sections, we provide a tire valve which is securable independently of the felly. Instead of radially extending the valve through the felly, we provide an improved air valve designated generally by the numeral 25, the shank of which extends laterally through the tire securing means to a side of the tire. The shank of the valve 25 extends laterally in a transverse groove 26 in the clencher seat 10, and in the example shown it extends also through a registering hole 27 in one clamp 16. The seat 10 has a radial central hole 28 communicating with the transverse groove 26 and extending radially outward to the face of the said seat so that the head 29 of the valve which overlaps the air sack 15 or equivalent pneumatic element, will be disposed in the depression 14. By this arrangement, it will be seen that in removing the tire the tire securing means is detached laterally from the wheel and the air valve will be detached with the tire.

By the described construction it will be seen that the reservoir sections provide separate and independent cells each having its own air valve and each attachable and detachable independently of adjacent cells.

In the form shown in Fig. 5, the elements are the same as described except that in connection with the felly B additional supporting elements are provided beneath the channeled rim A. These elements include two annular bands 30 disposed between the felly and rim and meeting at the approximate center thereof, said bands having depending flanges 31 at right angles to the bands and lying against the side faces of the felly B.

Having thus described our invention we claim as new and desire to secure by Letters Patent:

1. In a pneumatic tire, a rim, a plurality of seats on the rim and having transverse grooves, a separate and independent air reservoir for each seat, the seats and reservoirs having coacting clencher members, and registering openings, clamps at opposite sides of the tire and having interengagement with the rim and clencher seats, bolts for securing the clamps in position, and a separate and independent air valve for each seat, said valve having its shank arranged in the groove of a seat and extending laterally through the clamps.

2. In a pneumatic tire, a rim, an annular series of bulbous pneumatic cells each having a casing and an inflatable inner sack, a seat for the inner side of the casing, the casing and seat having annular co-acting clencher elements, filler blocks between adjacent seats, an annular series of sector-shaped clamps at each side of the tire, tongue and groove connection between the clamps and seats, and transverse bolts extending through the clamps at opposite sides and through the said filler blocks.

3. A pneumatic tire including an annular series of separate bulbous pneumatic air cells, each cell including a casing and an inflatable sack, a channeled rim, a separate detachable seat for each cell, the said seats and casing having interengaging clencher elements and the seats having rigid ribs at the opposite sides thereof, and separate clamps at opposite sides of the tire, said clamps having grooves receiving the said ribs on the seats and adapted to accommodate also the sides of the rim, and bolts for detachably securing said clamps.

4. In a pneumatic tire, an annular series of bulbous pneumatic cells, each having an annular bead, a flanged rim, a seat for each air cell having an annular clencher member engaging the bead of the cell and provided with lateral lugs, sector shaped clamps having flaring flanges and grooves receiving the lugs of the clencher member and the flanges of the rim, spacing blocks between the air cells, bolts passing through the spacing blocks and the clamps, and a separate and independent valve for each air cell, said valve extending laterally through the seat and one of the clamps.

5. In a pneumatic tire, a flanged rim, a plurality of seats, each having lateral lugs, a central opening and a transverse groove, bulbous pneumatic cells on the seats, the seats and cells having co-acting clencher members, clamps on opposite sides of the tire and having grooves receiving the lugs of the seats and the flanges of the rim, spacing blocks between the cells, bolts passing through the clamps and blocks, and a valve for each cell, said valve having its head disposed in the cell and its shank extending in the groove of the seat and through one of the clamps.

JAMES DRUMMOND.
CARL SPUHEL.
FRITZ SPUHEL.